UNITED STATES PATENT OFFICE.

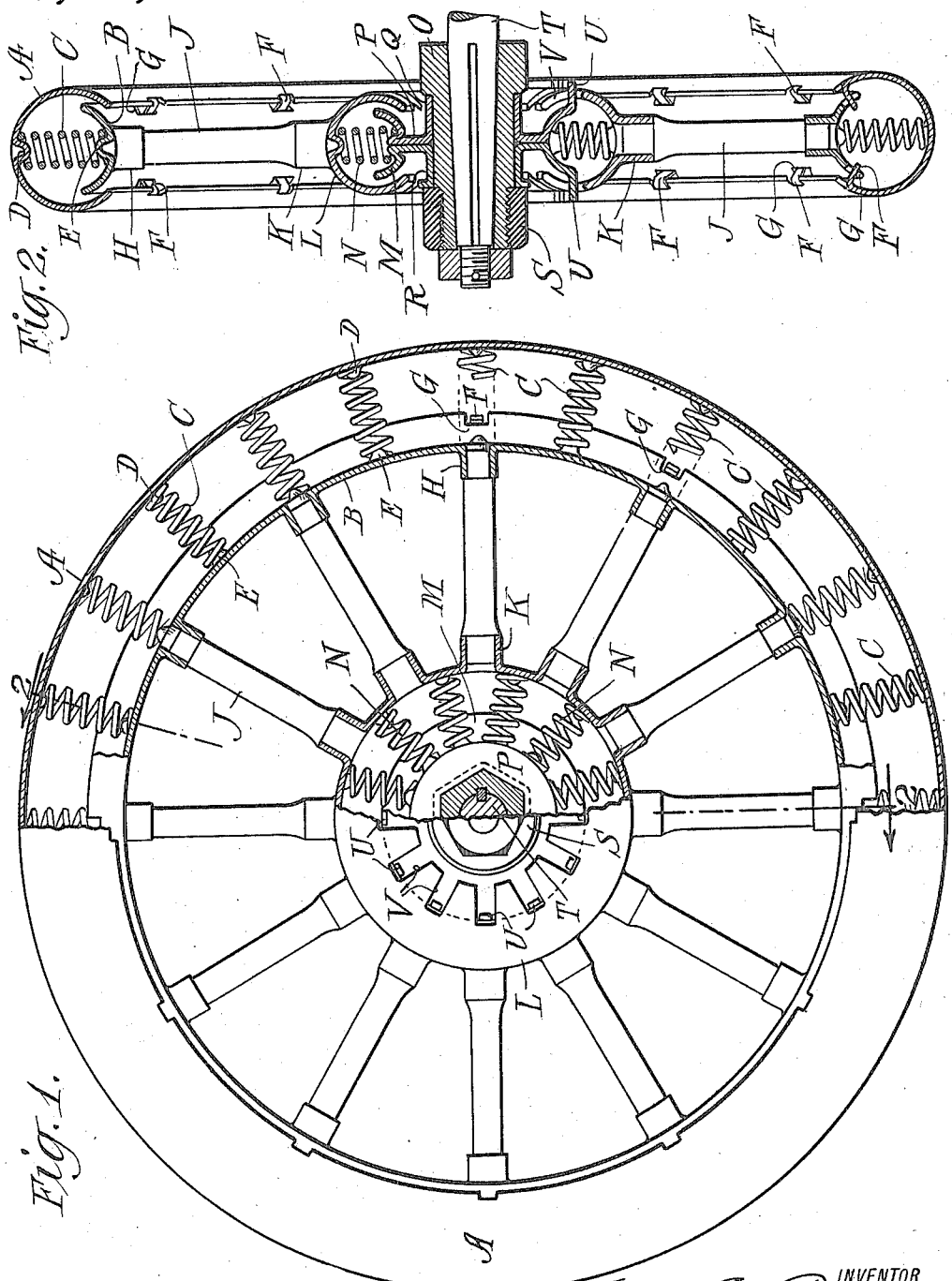

JACQUES M. PERLMAN, OF NEW YORK, N. Y.

SPRING-WHEEL.

1,263,463.

Specification of Letters Patent. Patented Apr. 23, 1918.

Application filed January 12, 1918. Serial No. 211,630.

*To all whom it may concern:*

Be it known that I, JACQUES M. PERLMAN, a citizen of the United States, residing in New York city, New York, at No. 126 West 22nd street, have invented certain new and useful Improvements in Spring-Wheels, of which the following is a specification.

My invention aims to provide an improved spring wheel designed particularly for a vehicle but adapted to be used also for pulleys and various other purposes.

The accompanying drawings illustrate one style of construction embodying the invention.

Figure 1 is in part a face elevation and in part a section transverse to the axis;

Fig 2 is a diametral section taken substantially on the line 2—2 of Fig. 1.

The drawing shows a wheel fixed on a driving shaft or axle but the same construction of wheel may be used where it is loose on the axle. A central portion provided with numerous springs is mounted on the axle and is connected by spokes with an outer portion which is also made yielding.

Thus the smaller or lighter shocks can be taken up by a movement of the rim alone or chiefly, and when greater shocks occur the springs in the central portion of the wheel will yield to permit the entire outer part and the spokes to move radially.

The outer portion of the wheel is composed of two parts one embracing the other with a space between the two in which are carried springs of suitable design, number and location; so as to permit a yielding relative movement of these two parts. In the case illustrated the rim A is circular in cross-section with an annular opening or slot on the inside equal in width to about one-quarter of the circumference. Within the flanges thus formed on the inner side of the rim is an annular member B somewhat wider than the opening and preferably also of circular or arc shape in cross-section. Between these two members are located helicoidal springs C held in position by projections D and E from the outer and inner members respectively, which springs yield not only radially but also in the direction of the circumference of the wheel and in the direction of its axis. A slight lateral play between the members A and B is provided and they are held together in the circumferential direction with a slight play by means of ears F bent up at intervals from the edges of the outer member and engaging notches G in the edges of the inner member. Various other styles of interengaging projections may be provided between the two members (as for example that explained hereinafter in connection with the parts of the central member of the wheel).

The inner portion B of the outer member of the wheel is provided at intervals with sockets H to receive the ends of the spokes J, the inner ends of the spokes being similarly introduced into sockets K formed in the outer portion of the central member of the wheel.

This central member of the wheel is similar in construction to the outer member. It comprises an outer annular portion L bent to form approximately a circle with a slot extending around its inner side and equal in width to about one-quarter of the circle; and an inner portion M which is arc shaped in cross-section and lies within the flanges formed by the ends of the outer portion L. Radially disposed helicoidal springs N are located between the two portions L and M. For convenience in mounting on the hub O, the inner ring M is preferably made in two portions joining each other along a plane transverse to the axis of the wheel, and having webs P welded or otherwise fastened together and flanges Q and R which are clamped by a nut S directly on the hub O which carries the driving axle T. A slight play is left in the direction of the axis of the wheel between the outer and inner portions L and M and interengaging projections are provided to compel these parts to move together in the circumferential direction but with a slight play. These projections may be of various sorts (like those shown for the parts of the outer member of the wheel above described for example), but for greater convenience in manufacture I have indicated ears U bent up from the edges of the inner part M and lying in notches V formed in the edges of the part L.

The outer member A which forms the actual rim of the wheel is preferably circular in cross-section as shown so as to permit it to tilt sidewise easily, but this as well as the inner part B and the parts L and M of the central member may be of various other cross-sections. They are readily bent up of sheet metal with the several projections and sockets required and the entire construction can be made very easily and cheaply. This outer member A may also be made of other material, such as bent wood for example, and may be provided if desired with a tire of rubber or other special suitable material. In fact, various modifications in the details and in the arrangement of the parts may be made by those skilled in the art and parts of the construction illustrated may be used in other combinations without departing from the invention as defined in the following claims. Where the several rings are shown continuous it will be understood that they may be divided into sections along axial or transverse planes in various ways for convenience in assembling.

What I claim is:

1. A spring wheel including an outer annular member A of circular cross-section with a slot around its inner side and a portion B curved in cross-section and lying within the flanges formed by the edges of the portion A and springs arranged between said portions A and B, said portions A and B being fitted to each other with freedom for slight lateral play and being provided with interengaging projections also having slight play for causing the two to move together circumferentially.

2. A spring wheel including a central annular member L of circular cross-section with a slot around its inner side and a portion M curved in cross-section and lying within the flange formed by the edges of the portion L and springs arranged between said portions L and M, said portions being fitted to each other with freedom for slight lateral play and being provided with inner projecting edges also having slight play for causing the two to move together circumferentially, in combination with a similar outer portion comprising annular members A and B and spokes connecting the member L with the member B at suitable intervals, said members L and B being provided with sockets engaging the ends of said spokes.

In witness whereof, I have hereunto signed my name.

JACQUES M. PERLMAN.

Copies of this patent may be obtained for five cents each, by addressing the "Commissioner of Patents, Washington, D. C."